United States Patent [19]

Jackson

[11] 4,091,856
[45] May 30, 1978

[54] TIRE HAVING ANNULAR REINFORCING STRUCTURE AND COMPRESSED RUBBER HOOP

[75] Inventor: William Lewis Jackson, Birmingham, England

[73] Assignee: Dunlop Limited, London, England

[21] Appl. No.: 719,525

[22] Filed: Sept. 1, 1976

Related U.S. Application Data

[63] Continuation of Ser. No. 553,104, Feb. 26, 1975, abandoned.

[30] Foreign Application Priority Data

Feb. 26, 1974 United Kingdom .............. 08566/74

[51] Int. Cl.² ........................... B60C 7/22; B60C 9/18
[52] U.S. Cl. ........................... 152/361 R; 152/156; 152/354 RB; 152/374
[58] Field of Search ............. 52/330 RF, 360, 361 R, 52/354, 359, 374, 323, 158, 156

[56] References Cited

U.S. PATENT DOCUMENTS

| 1,164,834 | 12/1915 | MacMillan | 152/374 |
| 1,698,414 | 1/1929 | Palmer | 152/158 |
| 2,650,633 | 9/1953 | Eger | 152/354 |
| 3,238,988 | 3/1966 | Roque | 152/156 |
| 3,734,157 | 5/1973 | Roque | 152/158 |

*Primary Examiner*—Albert J. Makay
*Assistant Examiner*—Randolph A. Reese
*Attorney, Agent, or Firm*—Stevens, Davis, Miller & Mosher

[57] ABSTRACT

A tire, which can be solid or pneumatic, which has an elastomeric tread portion, an inextensible annular reinforcing structure beneath the tread and a hoop of rubber inwardly of the reinforcing structure. The hoop of rubber is held in a state of compression in the unloaded and, if the tire is pneumatic, uninflated state of the tire by the annular reinforcing structure.

7 Claims, 14 Drawing Figures

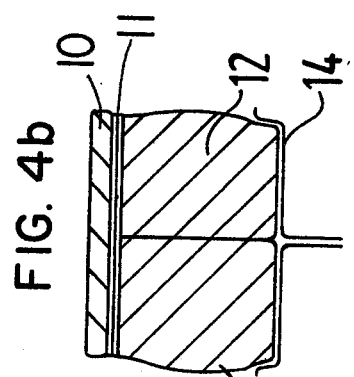
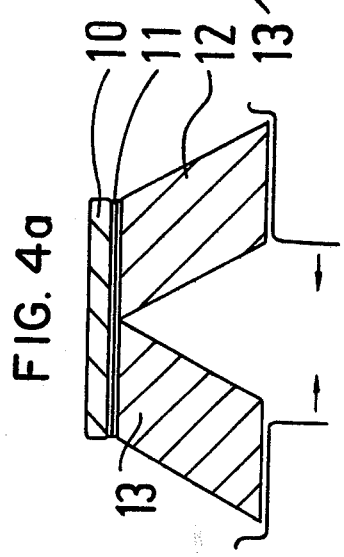

TIRE HAVING ANNULAR REINFORCING STRUCTURE AND COMPRESSED RUBBER HOOP

This is a Continuation of application Ser. No. 553,104 filed Feb. 26, 1975, now abandoned.

This invention relates to tires.

According to the invention there is provided a tire including an integral parts of its structure the following:

a. a tread portion of elastomeric material;

b. bracing the tread portion and inwardly of it, an annular reinforcing structure which is substantially inextensible in both its circumferential and its transverse directions; and c. radially inwardly of the annular reinforcing structure, a hoop of rubbers which in the unloaded and, if appropriate, uninflated state of the tire, is maintained in a compressed condition by the annular reinforcing structure.

There can be ambiguity in describing the state of stress or strain of a sample of rubber. It is to be noted, therefore, that in this specification the term "compressed" as applied to rubber refers to any state of strain in which the largest boundary stress components acting on the sample of rubber are directed so as to tend to produce a compressive strain.

The tire may be a solid or cushion tire, in which substantially the whole of a vertical load is borne by the rubber or may be a pneumatic tire in which air pressure within the tire assists in supporting the load. In either case the incorporation of the hoop of pre-compressed rubber into the tire results in an increase in the load carrying capacity of the tire while minimizing the attendant difficulties of heat generation normally resulting from additional rubber being incorporated into the tires.

At the same time the comfort of the tire, i.e. the ability to absorb road obstacles without transmitting unpleasant vibrations to the axle, and thence to vehicle and occupants, can be maintained and in some cases improved.

The invention will now be described in more detail with reference to the accompanying drawings of which:

FIGS. 1(a) through 1(d) show the stages in the manufacture of a solid tire according to this invention;

FIGS. 2(a) and 2(b) illustrate another method of making a tire including pre-compressed rubber;

FIGS. 3(a) and 3(b) illustrate possible cross-sectional configurations for the hoop;

FIGS. 4(a) and 4(b) illustrate a further method of making a non-pneumatic tire containing a hoop of compressed rubber;

FIGS. 5(a) through 5(c) illustrate the application of the hoop in a pneumatic tire and FIG. 6 is a graph showing the effect of the precompressed rubber on the response to vertical and horizontal vibration of a pneumatic tire.

The performance of solid elastomeric tires is limited in speed and load-carrying capacity by the hysteresis of the materials used in their construction. The limitations are approximately according to the equation:

$$T^2L^2HS/MA \leq \text{LIMIT}$$

$T$ = Radial thickness of the tire
$L$ = Vertical load on the tire
$H$ = Hysteresis loss factor of the tire rubber
$S$ = Speed (deflection cycles/unit time)
$M$ = Modulus of elasticity of the rubber
$A$ = Effective area of contact patch The limit referred to above depends on the effective rate of cooling of the particular tire involved.

This invention is concerned with improving the load carrying capacity of the tires by pre-stressing a hoop of rubber in the tire in compression.

The value of pre-compression can be understood in general terms by reference to the above equation since the effect of the pre-compression in the rubber is to increase the modulus of elasticity (M) without increasing the Hysteresis loss factor H. Thus pre-compressing reduces the value of $T^2L^2HS/MA$ and therefore allows a greater load L to be carried by the tire without exceeding the limit.

It will be appreciated that this equation represents a simplified approximation of the situation in a tire. Depending upon the manner of manufacture of the tire the degree of pre-compression may not be uniform throughout the compressed rubber. In general, however, it is preferred that no part of the hoop of pre-compressed rubber is pre-compressed by more than 30%. The average pre-compression over the whole of the hoop of pre-compressed rubber is preferably in the range 10% to 20% although lower pre-compressions than this may also have value, especially in pneumatic tires as is described later in this specification.

It is also to be noted that the higher the modulus of the rubber the lower the degree of pre-compression required for a given effect on load capability.

FIG. 1 shows how a solid tire containing a hoop of pre-compressed rubber can be made. FIG. 1(a) shows a precured belt 1 consisting of, for example, cross biased plies of textile or steel cords embedded in rubber compound as used in the breakers of conventional radial tires. This belt will form a suitable annular reinforcing structure in the tire. FIG. 1(b) shows the main body 2 or cushion of the tire which is cured to a larger external diameter than the internal diameter of the reinforcing structure.

FIG. 1(c) shows the cushion 2 after it has been compressed and fitted inside the belt 1. It is necessary to make some provision for fixing this in place. However, conventional bonding techniques or even mating ridges and grooves are adequate because the pre-compression of the rubber in the cushion urges it outwardly into the reinforcing structure and thus urges the two surfaces together.

FIG. 1(d) shows a cross-section through the finished tire. The dotted line outlines a tread layer 3 which has not been shown in the previous sketches.

There is no pre-compression in the tread layer 3 illustrated in FIG. 1(d) and this region is still subject to the original limits before pre-compression. This is not a critical problem because for the tread layer 3 the thickness T can be very small and the Modulus M can be very large without impairing the ability of the tire to cushion obstacles. This function is now performed separately by the material inside the hoop.

In practice therefore, the use of the pre-compressed rubber increases the load-carrying/speed capability for a given size of solid tire.

So far only the simplest design and the simplest method of manufacture have been described.

It is however possible to make the tire in one operation by building and curing it inside out as in FIG. 2(a) where the tread 4 is inwardly of a belt 5 and the cushion 6 is the outermost portion. After this it is turned inside out as in FIG. 2(b).

Since as shown in FIG. 2(a) and 2(b) the method gives an undesirable pre-stretch in the tread as well as pre-compressing the cushion it is preferred to apply the tread after turning inside out an assembly of the annular reinforcing structure and the cushion.

If desired it would be possible to make the tire turning only the cushion inside and out before fitting the hoop and tread.

By many of these routes the pre-compression in the cushion would be found to increase towards the center and it is possible to exploit this by using a cross-section with sloping sides, triangular or trapezoidal.

FIG. 3(a) shows a hoop of rubber having in section a triangular outline before turning inside out. The sloping faces are concave.

FIG. 3(b) shows the same section after turning inside out. The sloping surfaces have now bulged outwards and are less concave. This concavity helps to avoid tensile stresses and fatigue cracking.

A preferred method for the manufacture of a solid tire in accordance with the invention which does not involve inversion of any of the components is illustrated in FIGS. 4a and 4b. The tire is manufactured in the cross-sectional shape shown in FIG. 4a and consists of a tread portion 10, an inextensible annular reinforcement 11 and a pair of solid rubber tire components 12 and 13 which are molded to the interior of the reinforcement but splay outwards radially inwardly. As shown in FIG. 4b the tire is used on a divided rim 14 which has the same diameter as the internal diameter of the two rubber components 12 and 13 as molded. In mounting the tire on the rim the components 12 and 13 are drawn together to form a substantially solid tire. In this step these components are forced to reduce their length in cross-section and thus become pre-compressed.

To the scale shown this modification is capable of increasing the load capability of the tire by about 20% without the major increase in hysteretic energy loss usually associated with thick inner linings.

The effect of the hoop of compressed rubber on the ride comfort of a pneumatic tire is illustrated by the following example.

Two 155-12 Dunlop SP Sport textile radial tires were fitted with hoops of rubber positioned beneath the crown region on the interior of the tire. In one case the hoop was not pre-stressed and in the other it was. The amount of pre-stress in the latter case was of the order of 4%. The rubber used in the hoops was a natural rubber compound of the formulation given below in the Table.

TABLE

|  | Parts by Weight |
|---|---|
| SMR 20 | 100 |
| Flectol flakes | 2.5 |
| Nonox ZA | 1.0 |
| Mineral oil | 5.0 |
| ZnO | 4.0 |
| Stearic acid | 1.0 |
| GPF Black | 65.0 |
| Sulphur | 3.0 |
| Santocure | 1.0 |

TABLE-continued

|  | Parts by Weight |
|---|---|
| PVI 50 | 0.8 |

SMR 20 is a standard Malaysian Natural Rubber.

Flectol flakes are a proprietory product consisting of (2,2,4 trimethyldihydroquinoline).

Nonox ZA is Phenyl Isopropyl p-phenylene diamine (IPPD).

Santocure is N.cyclohexyl benzthiazole sulphenamide (CBS) PVI 50 is 50% cyclohexyl thiophthalimide + 50% inert inorganic filler.

The hardness of the compound was 64° BS and its modulus of elasticity was 7.00 MN/meter$^2$ measured dynamically at 15 Hz and 10% amplitude i.e. oscillating between 0 and 10% elongation.

The load deflection curves were plotted for each tire and it was found that at a scheduled pressure of 20 p.s.i. the tire with the pre-stressed hoop exhibited a load deflection curve about 7% steeper than the control without pre-compression i.e. the tire with the pre-stressed hoop of rubber was deflected less by a given load than the control.

Figures 1A, 1B, 1C, 1D:
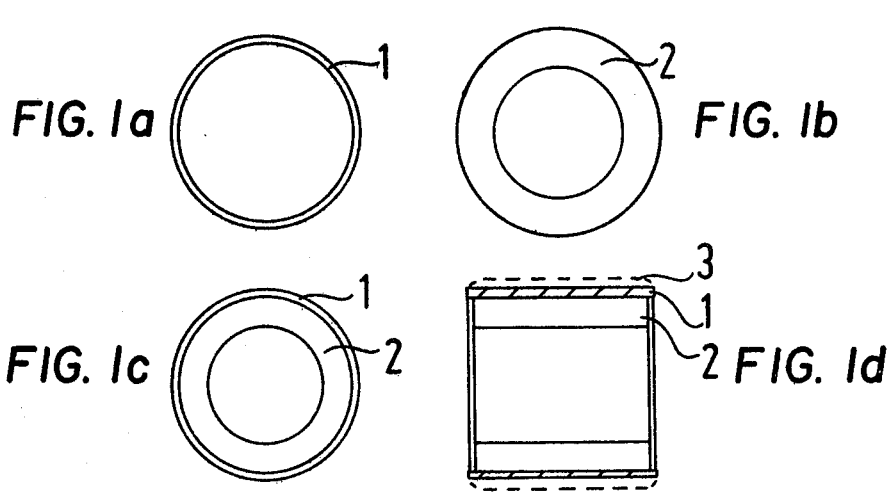
Figures 2A, 2B:
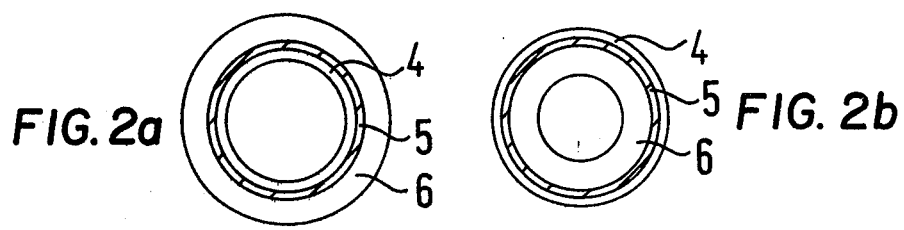
Figures 3A, 3B:
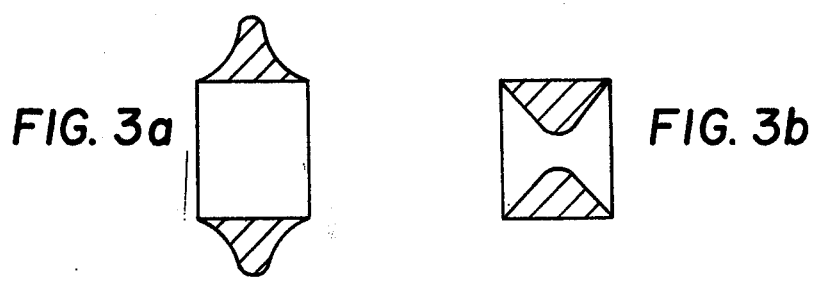
Figures 5A, 5B, 5C:
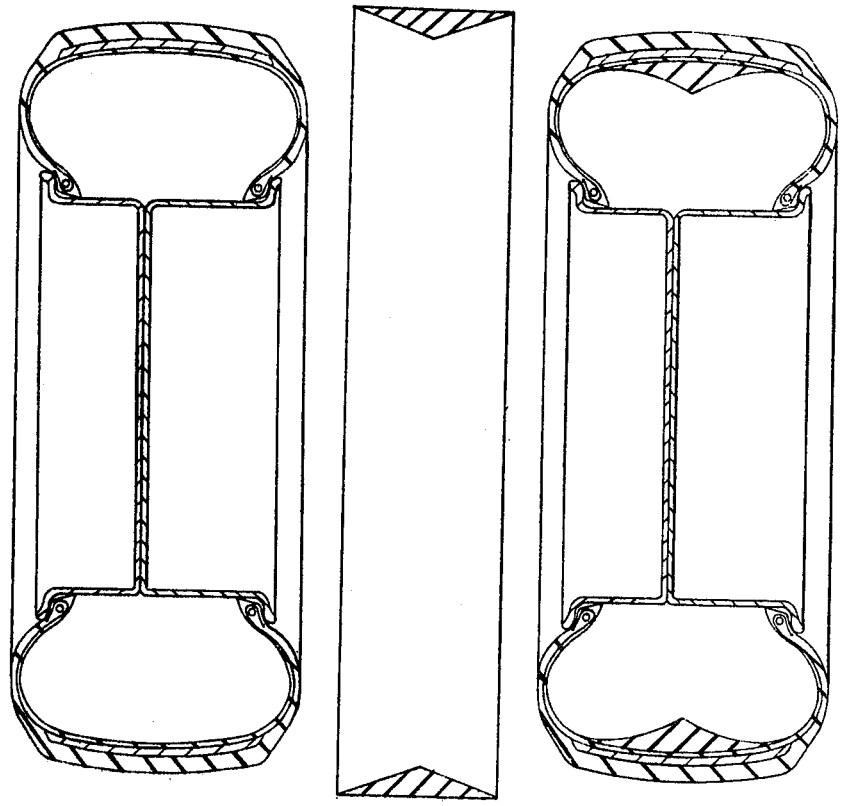
FIG. 5a shows a cross-section of a radial ply pneumatic tire on a rim.
FIG. 5b shows a cross-section of a hoop of elastomer of larger diameter than the inside surface of the breaker region.
FIG. 5c shows the hoop bonded in place on the inside surface.
Figure 6:
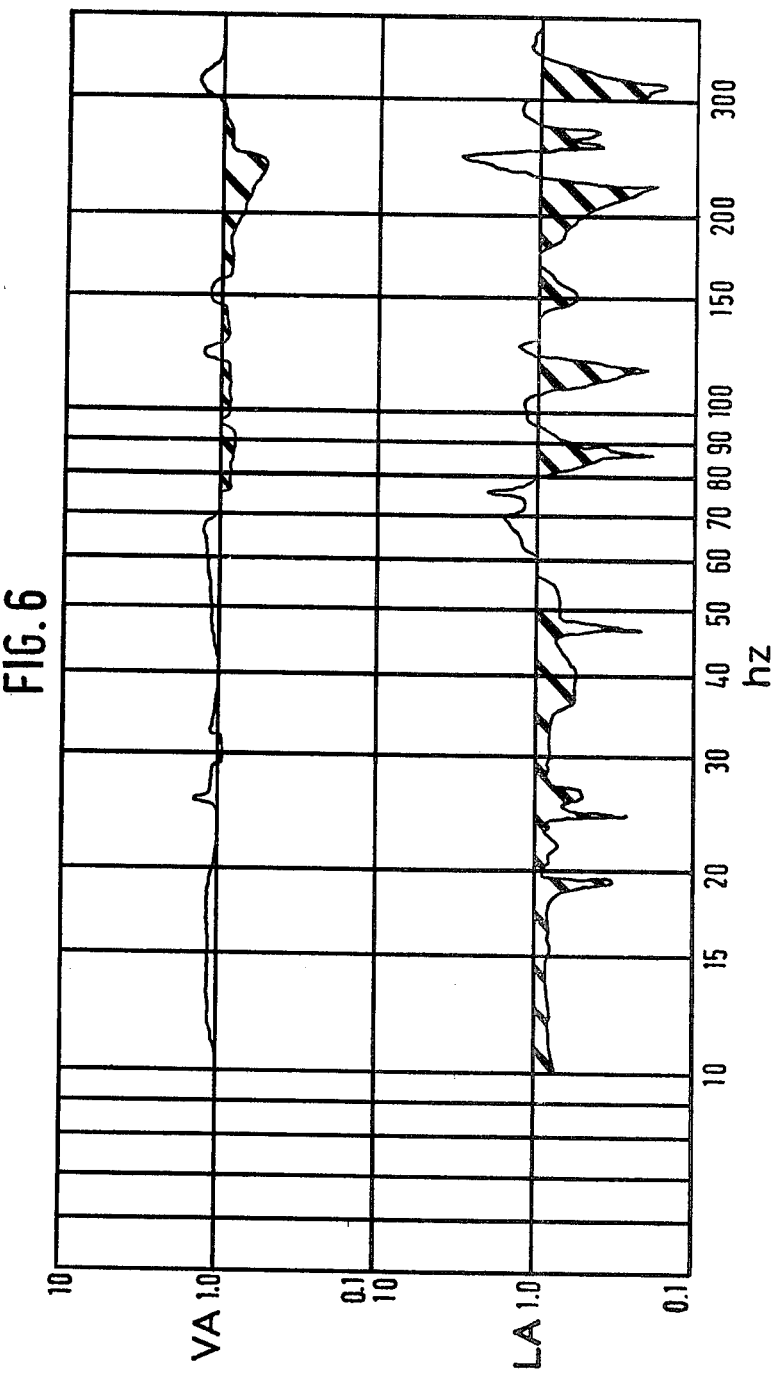

The vibration transmission of the tires was measured by mounting the tires inflated to 20 p.s.i. on a laboratory Machpherson strut tire suspension, rotating the tires under a load of 550 lbs. on a slatted drum to vibrate the tires and measuring the induced acceleration of the axle of the wheel on which the tire was mounted over a wide range of frequencies of excitation. For both radial (or vertical) acceleration V A and longitudinal acceleration L A the results for the pre-stressed hoop are plotted in FIG. 6 as a ratio of the accelerations transmitted by the tire containing the pre-compressed rubber and the tire containing unpre-compressed rubber respectively against the frequency of vibration to which the tire was submitted i.e. the excitation frequency.

The shaded areas represent the parts of the frequency range over which the tire containing pre-stressed rubber gave a better performance.

Longitudinal acceleration is particularly important because vehicle designers are subject to greater restriction in the design of suspension stiffness in this direction than in the vertical direction.

The pre-stressed hoop shows a clear advantage in reduced vibration transmission over most of the frequency range for the longitudinal effect.

Having now described my invention, what I claim is:
1. A pneumatic tire comprising:
a tread portion of elastomeric material,
sidewall portions,
an annular reinforcing belt bracing said tread portion, said belt being substantially axially coextensive with said tread portion, being immediately radially inwardly thereof, and being substantially inextensible in both its circumferential and transverse directions, and
a hoop of pre-compressed rubber radially inwardly of said annular reinforcing belt which hoop, in the unloaded and uninflated state of the tire, is maintained in a compressed condition by the equal and opposite tension in the annular reinforcing belt, said hoop being beneath the tread portion only, and being substantially axially coextensive with the tread portion.

2. A tire according to claim 1 in which the tread portion has a radial thickness less than that of the hoop of compressed rubber.

3. A tire according to claim 1 which comprises a pair of reinforced bead portions and a carcass construction made up of cords extending in substantially radial planes from bead portion to bead portion.

4. A tire according to claim 3 in which the hoop of rubber has a cross-sectional shape which tapers towards the rotational axis of the tire.

5. A tire according to claim 1 in which the average compression in the hoop of rubber is in the range 10% to 20%.

6. A tire according to claim 1 in which the hoop of rubber is compressed to a degree which is less than 30%.

7. A tire comprising:
a tread portion of elastomeric material;
an annular reinforcing structure which is substantially inextensible in both its circumferential and its transverse directions and is located radially inwardly of the tread portion bracing said tread portion; and
a hoop of pre-compressed rubber located radially inwardly of said annular reinforcing structure beneath the tread portion only, which hoop, in the unloaded state of the tire, is maintained in a compressed condition by the equal and opposite tension in the annular reinforcing structure, said hoop of pre-compressed rubber comprising a pair of solid rubber tire components which splay axially outwardly and radially inwardly from the annular reinforcing structure to permit their being compressed into the precompressed state by being forced together between the annular reinforcing structure and a wheel rim.

* * * * *